2,799,665

ORGANIC PROCESSES FOR MANUFACTURE OF POLYETHER-ESTERS

James Lincoln, London, England, assignor to British Celanese Limited, a corporation of Great Britain No Drawing. Application August 17, 1953, Serial No. 374,825

Claims priority, application Great Britain August 21, 1952

10 Claims. (Cl. 260—47)

This invention relates to improvements in organic processes and is more particularly concerned with the production of certain aromatic polyesters.

I have found that aromatic polyesters may be readily obtained with an extremely smooth reaction by condensation of cyclic glycol carbonates with the other constituents or constituent of a reaction mixture containing both phenolic and carboxylic ester groups. Thus there may be present, in addition to the glycol carbonate, a diphenol together with a dicarboxylic ester, or there may be present a hydroxy aromatic carboxylic ester in which the hydroxy group, being attached to the aromatic nucleus, is phenolic.

It appears from the nature of the resulting polymers that the glycol carbonate reacts with the phenolic group or groups and that subsequently or simultaneously the resulting hydroxyalkoxy groups react with the carboxylic ester groups to make the polyester. This is the result of the reaction whether ester-interchange catalysts are added before the condensation or at some stage during the condensation. This is quite a remarkable result since the phenolic group itself is capable of ester-interchange with the carboxylic ester groups, and in addition of course the glycol carbonate is itself capable of yielding a polyglycol. Nevertheless, in spite of these possible competing reactions the product, at least when the phenolic and carboxylic ester groups are present in substantially equal proportions and the glycol carbonate is used in a proportion substantially equimolecular to the number of phenolic groups present, appears to be a completely homogeneous product and is substantially identical with the product which would be obtained by previous oxyalkylation, separation of the oxyalkylation product and subsequent polyesterification. Thus by reacting dimethyl terephthalate, hydroquinone and cyclic ethylene carbonate, a polyester is obtained which is indistinguishable from the product which is obtained according to U. S. patent application Ser. No. 281,474, filed April 9, 1952, now U. S. Patent No. 2,762,789, from pre-formed 1.4-dihydroxy-ethoxy-benzene and dimethyl terephthalate. Similarly the product obtained according to the present invention from methyl-4-hydroxy-benzoate and cyclic ethylene carbonate in equimolar proportions is indistinguishable from the product obtained from pre-formed para-hydroxy-ethoxy-benzoic ester. This type of reaction is substantially unknown in the polymer art since the usual result of condensation when various reactions are possible is to obtain a mixed polymer of much lower melting point than is to be expected from the single reaction. Furthermore the present reaction is unusual in that a cyclic compound, namely the cyclic ethylene carbonate, has its ethylene carbonate residues regularly distributed along the polymer chain in the resulting polyester. This is quite unlike a process such as the copolymerisation of hexamethylene diamine, adipic acid and caprolactam, where the resulting polyamide has its caprolactam residues distributed quite at random.

The invention further has the advantage that it is quite unnecessary to prepare beforehand the oxyalkylated phenolic compounds and quite unnecessary to purify them. Again this is a remarkable result since usually in polymer formation if the raw materials, in this case the oxyalkylated phenolic compounds, are not purified, the resulting polymer suffers in its properties and particularly in its melting point.

As diphenols for the purpose of the present invention may be mentioned hydroquinone, 4.4'-dihydroxy-diphenyl, 2.5-dichlor-hydroquinone, $\alpha.\beta$-bis-(4-hydroxyphenoxy)-ethane, 4.4'-dihydroxy-3.5.3'.5'- or 2.5.2'.5'-tetramethyldiphenyl and 1.5-, 2.6- and 2.7-dihydroxy-naphthalenes. These compounds are particularly of interest since they yield relatively high-melting polyesters. The use of cyclic glycol carbonates is particularly important in relation to components yielding high-melting polymers since the glycol carbonates have high solvent properties and hence the reaction mixture becomes homogeneous at a very early stage. This is presumably responsible for the smooth reaction. However, other diphenols may be employed according to the present invention.

The diphenols are to be employed with the esters of dicarboxylic acids. We prefer to use dicarboxylic acids whose carboxy groups are linked to aromatic nuclei, for example terephthalic acid, 4.4'-dicarboxy-diphenyl and 4.4'-dicarboxy-$\alpha.\beta$-diphenoxyethane. These dicarboxylic acids, in common with the diphenols mentioned above, have their reactive groups linked to the aromatic nuclei in such positions that there are at least four nuclear carbon atoms in each aromatic nucleus between the linkages. In this definition a single benzene ring or a single naphthalene ring counts as one aromatic nucleus while diphenyl and $\alpha.\beta$-diphenoxyethane count as two aromatic nuclei. The highest-melting polyesters are obtained by using diphenols and dicarboxylic acids in which the reactive groups are in the para-position in the case of a single benzene nucleus, in the 4.4'-position in the case of two benzene nuclei linked together, and in the 1.5- and 2.6-positions in the naphthalene nucleus. Such compounds have their reactive groups in diametrically opposite positions.

Compounds may be used in which the phenolic group is present in the same molecule as the carboxylic ester, as in the methyl-4-hydroxy-benzoate mentioned above. Similarly esters of nuclear chlorinated or methylated para-hydroxy-benzoic acids may be used with the glycol carbonates to produce polymers of the type described in U. S. applications Ser. Nos. 296,749 and 296,750 both filed July 1, 1952, now U. S. Patent Nos. 2,692,248 and 2,692,249, respectively. These nuclear hydroxylated aromatic acids also have their reactive groups in positions similar to those described above for the diphenols and the dicarboxylic acids.

As already indicated, an ester-interchange catalyst may be employed to accelerate the polyesterification. Generally it is of advantage to add such an ester-interchange catalyst before starting the reaction, since it appears to assist the reaction between the glycol carbonate and the phenolic groups. However, the glycol carbonate and the compounds containing the phenolic groups and the carboxylic ester groups may first be reacted until carbon dioxide ceases to be evolved, and the ester-interchange catalyst then added. Such ester-interchange catalysts include sodium, potassium and lithium metals, magnesium ribbon and alkali metal alcoholates.

To obtain high polymers the reaction mixtures according to the present invention should have the phenolic and carboxylic ester groups present in substantially equal proportions, and to obtain the highest-melting polymers the cyclic glycol carbonate should be present in a proportion equimolecular to the number of phenolic groups present or a proportion not much higher, for example not higher than 1.2 times the equivalent. If higher proportions of glycol carbonate are used, polyesters are obtained but in general their melting points tend to be somewhat lower. Cyclic ethylene carbonate is the most useful reagent according to the present invention but other cyclic glycol carbonates which may be used include cyclic trimethylene carbonate, cyclic propylene carbonate and cyclic 1.2- or 2.3-butylene carbonates. These carbonates may readily be produced from the corresponding glycols by treatment with phosgene or with an appropriate acyclic carbonate, and especially such carbonates as dibutyl carbonate or diphenyl carbonate which permit a relatively high reaction temperature.

The reaction of polyesterification according to the present invention is generally conducted at temperatures between 200 and 300° C. The initial part of the reaction is preferably carried out at the boiling point of the cyclic carbonate, which in the case of cyclic ethylene carbonate is about 240° C. The reaction may be carried out under reflux so as to avoid loss of the carbonate. In this way the reaction goes quite readily at atmospheric pressure, another advantage of the use of these carbonates.

As regards the carboxylic ester groups, these may be esters with methyl alcohol, ethyl alcohol or isopropyl alcohol or with phenol. It is merely essential that the monohydroxy compound be volatile under the conditions used in the polyesterification, particularly towards the end of the reaction.

The following examples illustrate the production of polymers according to the present invention:

*Example 1*

45.6 parts by weight of 4-hydroxy-benzoic acid methyl ester and 26.4 parts of cyclic ethylene carbonate (i. e. equimolecular proportions) were mixed together in a vessel provided with an air condenser, and a small amount of magnesium ribbon added. The temperature was raised to 230° C., when bubbling became vigorous. After 2 hours' heating at 230° C. the mixture was further heated for 2 hours at 280° C. At this stage the polymer was already crystalline. The air condenser was removed and heating continued for a further 4 hours at 280° C. and finally for 2 hours at 280° C. under an absolute pressure of 4 mms. of mercury. The melting point of the product was 203° C., i. e. substantially identical with that obtained by the polyesterification of para-hydroxyethoxy-benzoic ester, and the product could be melt spun to give filaments exhibiting good cold-drawing properties.

*Example 2*

11 parts by weight of hydroquinone, 19.4 parts by weight of dimethyl terephthalate and 17.6 parts by weight of cyclic ethylene carbonate (i. e. molar proportions of 1:1:2) were mixed in a vessel provided with an air condenser, and 0.24 parts of solid sodium methoxide and a small amount of magnesium ribbon were added. The whole was heated to 200° C. and reacted quite vigorously. The temperature was gradually raised to 220° C. and after about 2 hours evolution of carbon dioxide had practically ceased. The air condenser was then removed and heating continued for 4 hours at 280° C. and finally for 2½ hours at 280° C. under an absolute pressure of 2 mms. of mercury. The product was a slightly cream coloured solid having a melting point of 197° C. (this is to be compared with the melting point of 197–198° C. given in U. S. application Ser. No. 281,474 for the product from 1.4-dihydroxyethoxybenzene and dimethyl terephthalate). The polymer gave fibres from the melt which had good cold-drawing properties.

*Example 3*

22 parts by weight of hydroquinone, 35.2 parts by weight of cyclic ethylene carbonate and 38.8 parts by weight of dimethyl terephthalate were mixed together and heated under reflux on a bath at a temperature rising from 200 to 250° C. The reaction was carried out under nitrogen and continued until evolution of carbon dioxide became negligible. A small quantity of magnesium ribbon was then added and heating continued, the reaction temperature being gradually taken up to 280° C. The reflux condenser was then removed and heating continued at the same temperature under an absolute pressure of 4–5 mms. of mercury. The resulting product was a white crystalline polymer having a melting point of 197°, again substantially identical with the melting point of the polymer obtainable from dimethyl terephthalate and preformed 1.4-dihydroxyethoxy-benzene.

Having described my invention, what I desire to secure by Letters Patent is:

1. Process for the manufacture of a linear aromatic polyether ester containing phenoxy ether linkages, which comprises heating at a temperature of 200°–300° C. until a polymer has been formed a mixture of a cyclic carbonate of an alkylene glycol containing 2 to 4 carbon atoms in the molecule with at least one compound selected from the group which consists of dihydroxy phenols in which the hydroxyl groups are the only functional groups, monohydroxy aromatic monocarboxylic esters in which the hydroxyl and esterified carboxyl groups are the only functional groups and are separated by 4 nuclear carbon atoms for each aromatic nucleus in the ester and the esterifying group is a monofunctional monohydroxy compound of boiling point below 200° C., and diesters of dicarboxylic acids in which the esterified carboxyl groups are the only functional groups and the esterifying group is a monofunctional monohydroxy compound of boiling point below 200° C., the selection being so limited that the reacting mixture contains substantially equal numbers of free phenolic hydroxyl and esterified carboxyl groups, the said mixture containing 1–1.2 molecules of the cyclic carbonate of a glycol for each phenolic hydroxyl group.

2. Process according to claim 1, wherein cyclic ethylene carbonate is heated with an ester of p-hydoxybenzoic acid.

3. Process according to claim 1, wherein cyclic ethylene carbonate is heated with hydroquinone and a diester of a dicarboxylic acid, the hydroquinone and the diester being in substantially equimolecular proportions.

4. Process according to claim 1, wherein cyclic ethylene carbonate is heated with a dihydroxy phenol and a diester of an aromatic dicarboxylic acid in which the carboxyl groups are separated by 4 nuclear carbon atoms for each aromatic nucleus in the acid, the dihydroxy phenol and the diester being in substantially equimolecular proportions.

5. Process according to claim 4, wherein cyclic ethylene carbonate is heated with hydroquinone and a diester of terephthalic acid, the hydroquinone and the diester being in substantially equimolecular proportions.

6. Process according to claim 1, wherein during at least part of the heating the mixture contains an ester-interchange catalyst, and heating is continued until a fibre-forming polymer has been formed.

7. Process according to claim 2, wherein during at least part of the heating the mixture contains an ester-interchange catalyst, and heating is continued until a fibre-forming polymer has been formed.

8. Process according to claim 3, wherein during at least part of the heating the mixture contains an ester-interchange catalyst, and heating is continued until a fibre-forming polymer has been formed.

9. Process according to claim 4, wherein during at least part of the heating the mixture contains an ester-interchange catalyst, and heating is continued until a fibre-forming polymer has been formed.

10. Process according to claim 5, wherein during at least part of the heating the mixture contains an ester-interchange catalyst, and heating is continued until a fibre-forming polymer has been formed.

References Cited in the file of this patent

UNITED STATES PATENTS

| | | |
|---|---|---|
| 2,448,767 | Carlson | Sept. 7, 1948 |
| 2,471,023 | Cook et al. | May 24, 1949 |
| 2,496,933 | Caldwell | Feb. 7, 1950 |
| 2,696,481 | Schneider | Dec. 7, 1954 |